United States Patent [19]

Williams

[11] Patent Number: 4,751,945

[45] Date of Patent: Jun. 21, 1988

[54] DUAL CONTAINMENT CHANNEL FOR FLUIDS

[75] Inventor: Barry C. Williams, Statesville, N.C.

[73] Assignee: Polydrain, Inc., Troutman, N.C.

[21] Appl. No.: 843,199

[22] Filed: Mar. 24, 1986

[51] Int. Cl.⁴ .............................................. F16L 9/18
[52] U.S. Cl. ..................................... 138/117; 138/92;
138/111; 138/115; 138/108; 174/68 C;
174/101; 285/121
[58] Field of Search ............... 138/103, 105, 108, 111,
138/114, 115, 116, 117, 157, 163, 92, 113;
174/68 C, 101; 285/121

[56] References Cited

U.S. PATENT DOCUMENTS

| | | | |
|---|---|---|---|
| 243,215 | 6/1881 | Collings | 138/117 |
| 247,432 | 9/1881 | Strohm | 138/113 |
| 344,843 | 7/1886 | Macdonald | 138/117 |
| 402,565 | 5/1889 | Cook | 138/113 |
| 405,576 | 6/1889 | Lynch | 138/117 |
| 698,902 | 4/1902 | Budd | 138/117 |
| 1,459,476 | 6/1923 | Meredith | 138/117 |
| 3,347,275 | 10/1967 | Murphy | 174/101 X |
| 3,503,425 | 3/1970 | Holm | 138/117 X |
| 3,793,793 | 2/1974 | Dobbins | 138/117 X |
| 4,349,220 | 9/1982 | Carroll et al. | 138/155 |

FOREIGN PATENT DOCUMENTS

| | | | |
|---|---|---|---|
| 30276 | 5/1918 | Norway | 138/117 |
| 18006 | of 1900 | United Kingdom | 138/117 |

Primary Examiner—James E. Bryant, III
Attorney, Agent, or Firm—W. Thad Adams, III

[57] ABSTRACT

A dual containment channel for fluids comprising a plurality of channel segments defining a channel run. Each of the channel segments comprises two spaced apart opposing channel segment side walls connected by a bottom wall for carrying a fluid. A cover is positioned between and supported by the side walls to enclose the open top of the channel run. A conduit support is positioned along the channel run along its length for supporting at least one fluid carrying conduit. An elastomeric sealing strip is positioned in two U-shaped grooves to form with grooves in the opposing channel segment side walls a continuous seal with the underside of the cover.

14 Claims, 6 Drawing Sheets

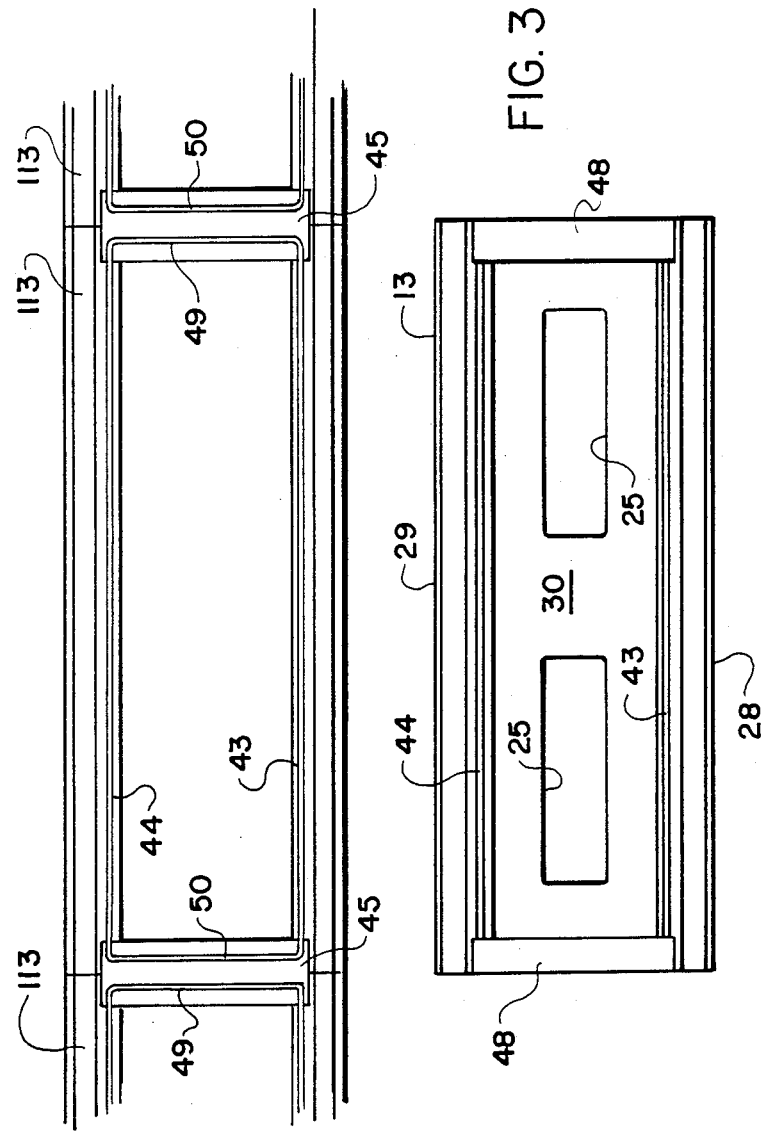

DUAL CONTAINMENT CHANNEL FOR FLUIDS

TECHNICAL FIELD AND BACKGROUND OF THE INVENTION

This invention relates to a dual containment channel for fluids. The invention has application with any type of fluid and many types of gases which must be conveyed in quantity from one place to another. However, this invention has particular utility in the conveyance of hazardous or toxic fluids such as are often found in heavy industrial facilities. The channel segments of the type referred to in this application may be constructed of various materials and according to various processes to support light, medium or heavy loads. In the particular embodiment described in this application, the channel segments are cast of "polyester concrete", a concrete aggregate material containing quartz and inert mineral fillers bonded with polyester resin.

Typically, the drainage channel segments are cast in relatively short lengths of one meter. The channels may be non-sloping, or if sloping, with a bottom slope of, for example, 0.6 percent from one end to the other. When sloping drainage channel segments are used, the channel is formed by using cast channel segments having successively higher walls so that when put in the proper order in a trench with their up surface horizontal, they collectively form a channel run having a predetermined slope.

Insofar as is known, drainage channels of the general type described above have heretofore been used for open drainage, i.e., the drainage of parking lots, airports and driveways and certain interior fluid drainage applications wherein a slotted grate is positioned in the open top of the drainage channels to permit drainage into the channel from a surrounding, relatively flat surface.

Hazardous fluids cannot be routinely conveyed in open top drainage channels, but instead in enclosed pipes or conduits. Recognizing that such pipes and conduits can leak because of manufacturing defects, excessive pressure, corrosion or other reasons, prior art dual containment systems generally involve the placement of a relatively small fluid carrying closed-wall conduit within a larger closed-wall conduit which does not carry fluids except in the event of a leak of liquid carried by the inner conduit. The smaller conduit is supported by resting directly on the lower, inner wall of the outer conduit.

While the above-described system will perform adequately to prevent leakage of hazardous fluids into the environment from the inner conduit, repairing the leak in the inner conduit is expensive and time consuming. In many cases, the inner and outer conduits are hundreds of feet long and are formed either of seamless extruded conduit or conduit formed of relatively long segments. Since both conduits are closed-wall, the outer conduit must be penetrated to determine the location of the leak in the inner conduit. In some cases, the inner conduit must be disconnected and physically removed from the outer conduit. In other instances, the outer conduit must be penetrated at intervals along its length to determine the position of the leak. Even then, further damage to the outer conduit must take place in order to remove and/or repair the inner conduit and return it to use.

The invention described in this application provides all of the safety and security of a dual wall containment system formed of inner and outer closed-wall conduits, while permitting easy access to the inner conduit to determine the location of a leak for repair. Furthermore, in accordance with one embodiment of the invention, leakage from an inner conduit can be drained away to a remote location for storage or disposal.

SUMMARY OF THE INVENTION

Therefore, it is an object of the invention to provide a double wall containment channel for fluids which permit easy access to the fluid carrying conduit for inspection and repair.

It is another object of the invention to provide a dual containment channel wherein the inner, fluid carrying conduit is supported within an outer channel.

It is yet another object of the invention to provide a dual containment channel formed of relatively short segments which can be easily removed and replaced if damaged.

It is yet another object of the invention to provide a fluid-tight yet easily removable cover for a dual containment channel to permit easy access for inspection and repair but yet providing security against leakage of fluids into the environment.

These and other objects and advantages of the invention are achieved in the preferred embodiments disclosed below by providing a dual containment channel for fluids which comprise a plurality of channel segments arranged end-to-end to define a channel run of a predetermined desired length. Each channel segment comprises two spaced-apart opposing channel segment side walls connected by an integrally-formed bottom wall to define a generally U-shaped structure having a top opening and a void therein for carrying a fluid. A cover is positioned between and supported by the side walls to enclose the open top of the channel run and retain any fluid within the channel whereby the channel run serves as an outer containment channel.

Saddles are positioned in spaced-apart relation within the channel along its predetermined length for supporting at least one elongate, closed-wall, fluid carrying conduit therein.

Any fluid leaking from the conduit is contained within the outer containment channel for ease of removal. Any leaks in or damage to the conduit can be easily located and repaired by removing the cover. Any leaks in or damage to the outer containment channel can be repaired by replacing only that channel segment or segments which are actually damaged. According to a preferred embodiment of the invention, each of the channel segments has walls which are the same height to define a non-sloping channel.

According to a preferred embodiment of the invention, the saddle has a concavity in the upper side thereof with a shape corresponding to the shape of the part of the conduit received and supported therein.

According to other embodiments of the invention, the concavity is arcuate to receive and support a cylindrical conduit. The saddle may also have a plurality of concavities for receiving and supporting a like number of conduits. Furthermore, at least two of the conduits may be stackable one over top of the other within the channel to receive and support at least two vertically spaced-apart conduits.

According to another preferred embodiment of the invention, the dual containment channel comprises an upper channel run and a plurality of channel segments are arranged end to end to define a lower channel run of a predetermined desired length. Each channel segment of the lower channel run comprises two spaced-apart opposing channel segment side walls connected by a generally U-shaped structure having a top opening and a void therein for carrying a fluid. The upper channel run is positioned in the top opening of the lower channel run and supported by the two spaced-apart opposing channel segment side walls of the lower channel run. The upper channel run defines at least one drainage hole in the bottom wall of each channel segment for permitting fluid in the upper channel run to drain into the lower channel run.

According to a preferred embodiment of the invention, the channel segments along the length of the lower channel run have progressively higher walls to define a sloping channel so that any fluid which drains into the lower channel run can be directed away for recapture and/or disposal.

In a preferred embodiment of the invention, the channel segments include sealing means positioned along the two spaced-apart opposing channel segment side walls and extending across from one side wall to the other side wall at each end of the channel segments and cooperating with the cover to prevent any fluids within the channel from escaping through the open top of the channel around the cover.

In accordance with the embodiment disclosed in this application, the sealing means comprise two spaced-apart opposing channel segment side walls defining an elongate groove along the longitudinal extent of the side walls. An elastomeric sealing strip is positioned in the groove to sealingly engage the underside of the cover. An end member is positioned in overlapping relation between two adjacent channel segments. Each end member preferably has two opposing U-shaped grooves for mating with and forming a continuous groove within the grooves in two spaced-apart channel segment side walls. An elastomeric sealing strip is positioned in the two U-shaped grooves to form with the longitudinally extending grooves in the opposing channel segment side walls a continuous closed-loop seal for sealing engagement with the underside of the cover.

BRIEF DESCRIPTION OF THE DRAWINGS

Some of the objects of the invention have been set forth above. Other objects and advantages of the invention will appear as the description of the invention proceeds when taken in conjunction with the following drawings, in which:

FIG. 3 is a top plan view of an upper channel segment according to the present invention;

FIG. 4 is a top plan view showing the inner connection of adjacent channel segments according to an embodiment of the invention;

DESCRIPTION OF THE PREFERRED EMBODIMENT

Figure 8:
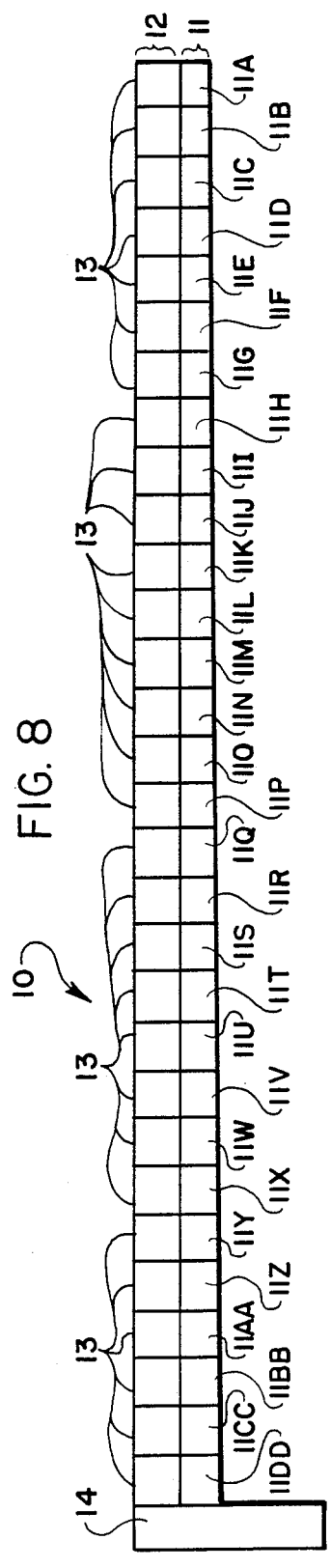
FIG. 8 is a longitudinal, compressed schematic view of a dual containment channel having a lower, sloped channel run and an upper non-sloped channel run.

Referring now specifically to the drawings, a dual containment channel according to one embodiment of the invention is shown in FIG. 8 and generally designated at 10. Channel 10 is comprised of a lower channel run 11 and an upper channel run 12. Lower channel run 11 is of a predetermined desired length and is formed of a predetermined desired number of individual channel segments 11A through 11DD. Each individual channel segment is identified separately because, as is shown in FIG. 8, lower channel run 11 has gradually increasing depth to define a sloping channel run 11.

In contrast, the upper channel run 12 comprises a like number of identical channel segments 13. Channel segments 13 therefore collectively comprise a channel run 12 which does not slope. As is also shown in Figure 8, the dual containment channel 10 can terminate in a suitable drain 14, such as a sump, holding reservoir or the like.

Figure 1:
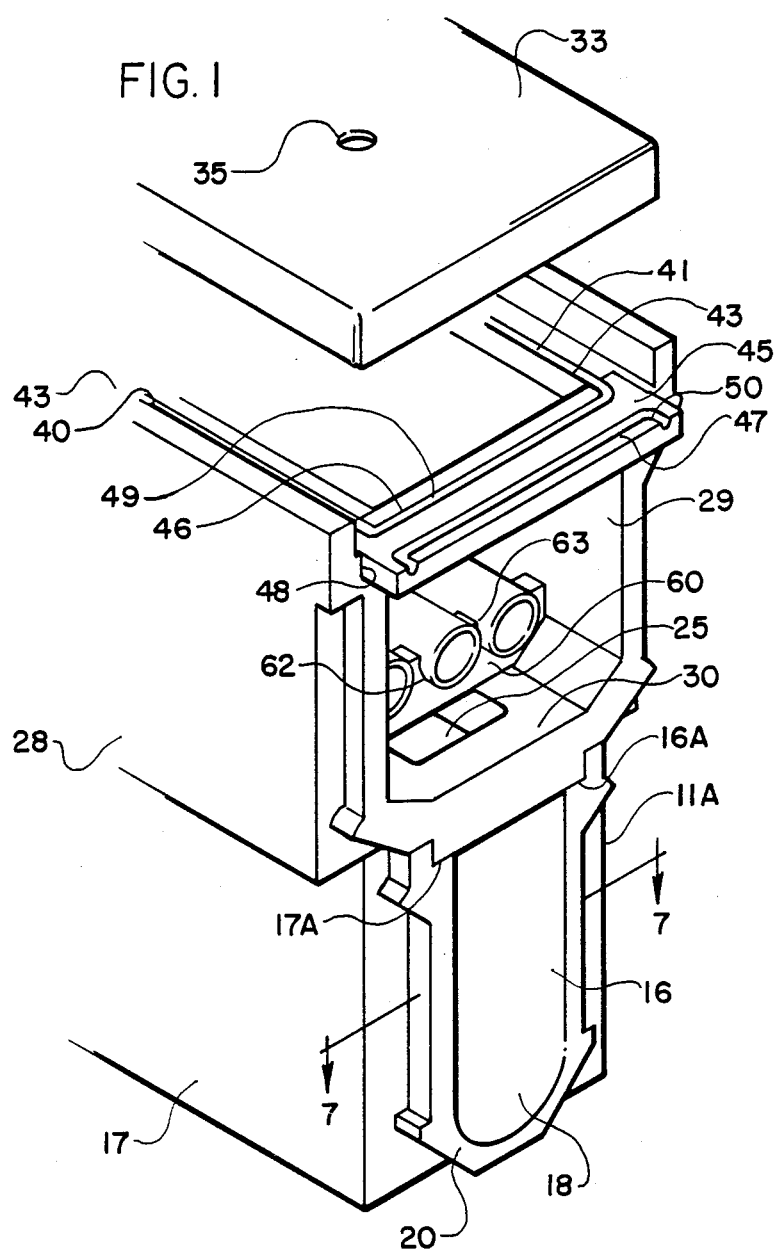
FIG. 1 is a fragmentary perspective view showing one end of a double wall containment channel, with a lower and upper drainage channel segment according to the invention.
Figure 7:
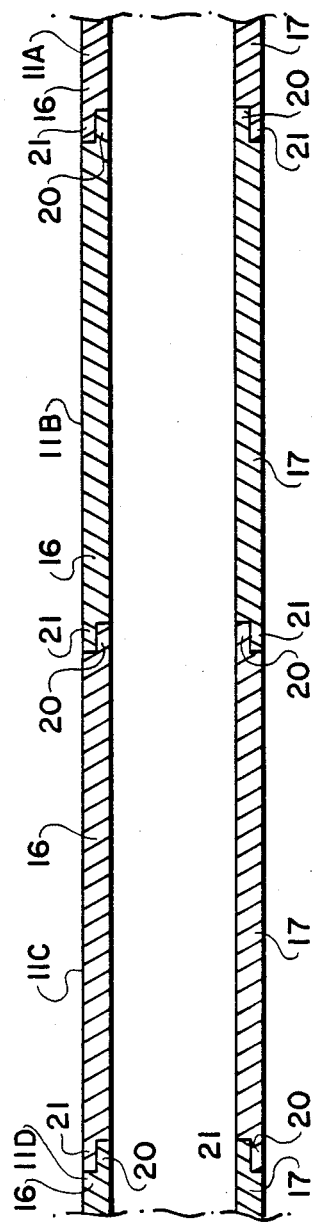
FIG. 7 is a longitudinal cross-sectional view taken substantially along lines 7—7 of FIG. 1 and showing inner connection of adjacent channel segments.
Figure 9:
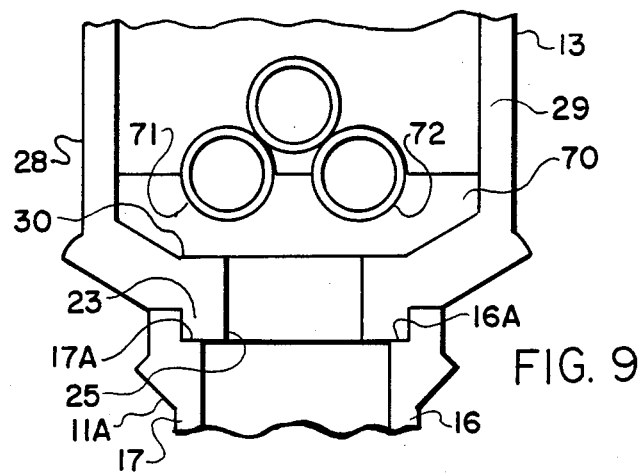
FIG. 9 is a fragmentary vertical end view of a channel segment showing a saddle according to one embodiment of the invention positioned therein.

Now that the dual containment channel 10 has been broadly described, it will be described in more detail by reference to FIG. 1 and following drawings. As is shown in FIG. 1, channel segment 11A of lower channel run 11, as well as all other channel segments of increasing depth 11B–11D shown in FIG. 8, include two spaced-apart, opposing side walls 16 and 17 which are connected by an integrally formed bottom wall 18 to define a generally U-shaped structure having a top opening and a void therein for carrying a fluid. Channel segment 11A is cast of polyester concrete material, as is described above, and is characterized by a very high strength to weight ratio and a resistance to many corrosive fluids and gases often found in an industrial environment. Channel segments 11A–11DD include a male connecting extension 20 which is adapted to mate with a female connecting extension 21 (see FIG. 7) which is formed on the other end of each channel segment 11A–11DD. Each of the channel segments 11B through 11DD are exactly as described above with the exception that the height of the side walls 16 and 17 gradually increases, as is shown in FIG. 8. Lower channel run 11 is secured into a trench with the top edge of channel run 11 in horizontal alignment. Therefore, channel run 11 slopes in a particular direction causing fluids to flow in that direction.

Figure 2:
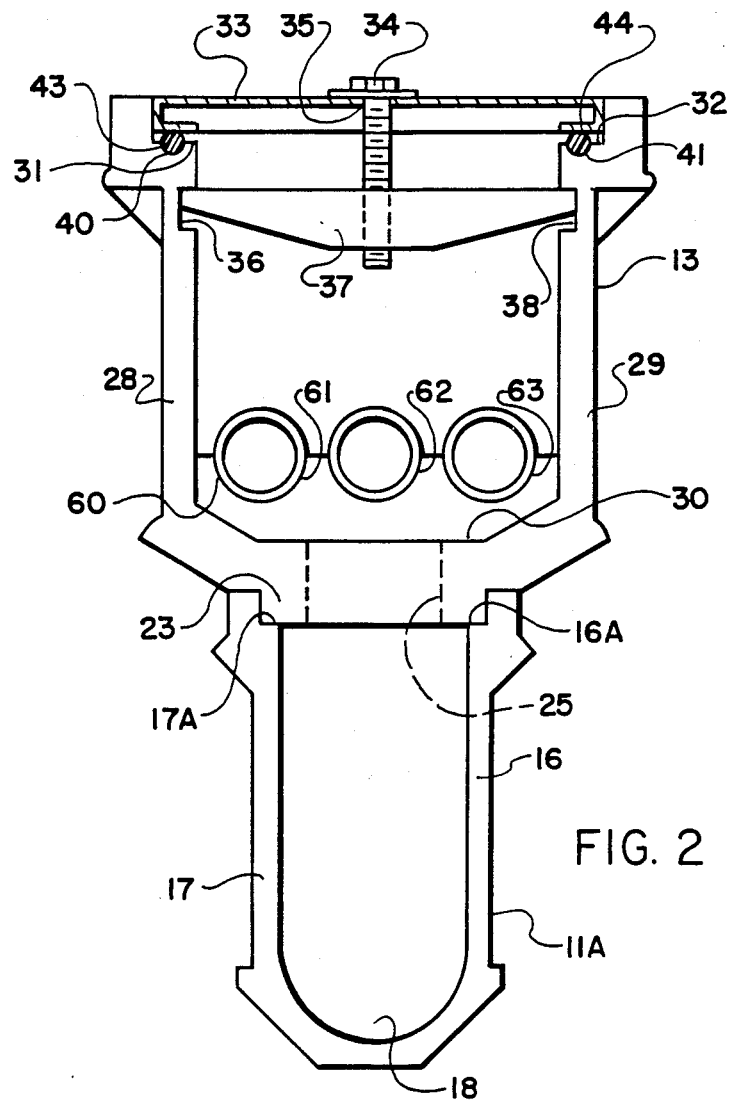
FIG. 2 is a vertical cross-sectional view similar to that in FIG. 1 but with the cover in place.
Figure 5:
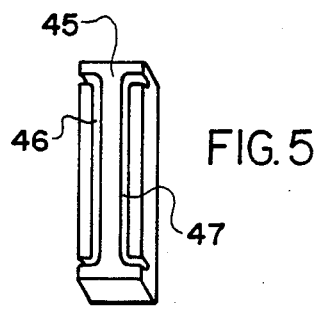
FIG. 5 is a perspective view of an end member which cooperates with adjacent channel segments to complete the seal between channel segments and the cover.

Referring to FIGS. 1 and 2, channel segment 13 is constructed with a bottom profile adapted to mate with the shape defined by side walls 16 and 17. This is best shown in FIG. 2. Channel segment 13 is molded of the same polyester concrete material as is channel segment 11A and includes a base 23 having dimensions which permit it to be positioned on shoulders 16A and 17A of side walls 16 and 17 of lower channel segment 11A. Each channel segment 13 includes at least one drainage hole 25 which permit fluids to flow into the lower channel run 11. As is shown in FIG. 3, each upper channel segment 13 includes two drainage holes 25 and 26 defined by base 23. Upper channel segment 13 is formed of two spaced-apart opposing channel segment side walls 28 and 29 which are connected on one end by an integrally formed bottom wall 30. Side walls 28 and 29 of channel segment 13 include shoulders 31 and 32 onto which is positioned a cover 33. Cover 33 is preferably constructed of sheet metal with folded sides and ends to form a structure resembling an inverted shallow pan. Cover 33 is positioned within the top opening of channel segment 13 by means of a rotating bolt 34 which is placed through a counter-sunk hole 35. A wing-shaped locking member 35 is threaded onto the free end of bolt 34. Locking member 37 is somewhat wider than the lateral dimensions of channel segment 13 and is designed to cooperate with a pair of recesses 36 and 38 formed on the interior surface of side walls 28 and 29, respectively. By rotating bolt 34, locking member 35 fits into recesses 36 and 38 and as bolt 34 is tightened, locks cover 33 into the open end of channel segment 13. In order to create an effective seal against the flow of fluids and gases through the top opening of channel segment 13, it is desirable to provide a tight seal between channel segment 13 and cover 33. This is accomplished by molding grooves 40 and 41 into shoulders 31 and 32, respectively. Sealing strips 43 and 44 are positioned in grooves 40 and 41 respectively, along the length of channel segment 13. This is best shown in FIGS. 3 and 4.

Figure 6:
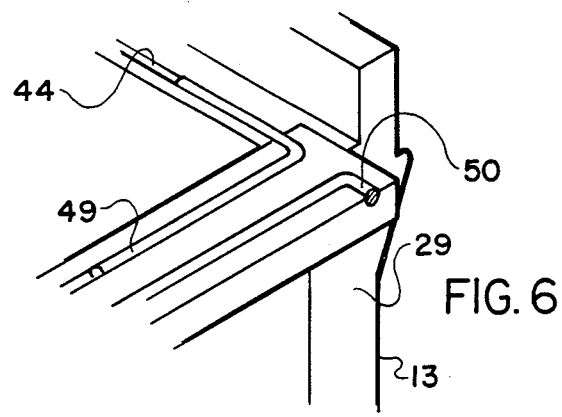
FIG. 6 is a fragmentary perspective view showing cooperation between an end member and a channel segment.
Figure 16:
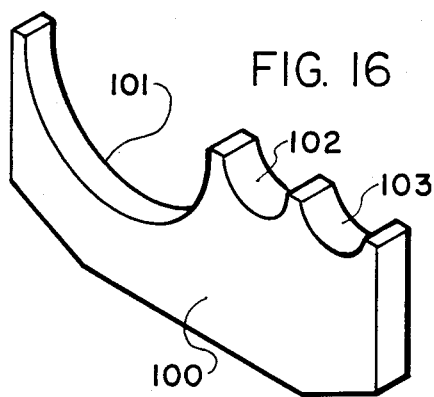
FIG. 16 is a perspective view of the saddle shown in FIG. 15.

However, this does not accomplish a seal at the juncture between adjacent covers 33. Sealing between adjacent covers 33 is accomplished by providing end members 45, each of which have two opposing U-shaped grooves 46 and 47 formed in their top surface. As is best shown in FIGS. 4 and 6, a single end member 45 is positioned in a recess 48 between opposing side walls 28 and 29 across the intersection of adjacent channel segments 13. Grooves 46 and 47 mate with grooves 40 and 41, respectively, so that a single continuous closed-loop groove is formed. Sealing strips 49 and 50 are positioned in grooves 46 and 47, respectively, and form a single, continuous closed-loop seal by cooperation with sealing strips 43 and 44.

Cover 33 is preferably either the same length as channel segments 13 or a multiple of the length of channel segments 13. By positioning cover 33 so that the end of adjacent covers 33 touch between grooves 46 and 47, a positive seal is effectuated which prevents the escape of any fluid or gas through the crack between adjacent covers 33.

Referring again to FIGS. 1 and 2, a saddle 60 is positioned in the bottom of channel segment 13. As is best shown in FIG. 1, saddle 60 is positioned across drainage hole 25 so that access to drainage hole 25 may be had from both sides. This permits fluids on either side of saddle 60 to flow through drainage hole 25 into lower channel run 11. Saddle 60 can be formed of the same polyester concrete from which channel segments 13 and 11A are formed, or may be constructed of some other non-corrosive material such as polyethylene or similar plastic material. The bottom and side walls of saddle 60 are shaped to conform to the bottom and side walls 28, 29 and 30 of upper channel segment 13. In the top wall of saddle 60 are positioned three semi-circular concavities 61, 62 and 63. Cylindrical conduits having a mating lower cross-section are positioned in concavities 61, 62 and 63 and are supported above bottom wall 30.

A very wide variety of different configurations of saddle 60 are possible. Only a few of such possibilities are illustrated in FIGS. 9–16. For example, saddle 70 includes two concavities 71 and 72 for holding two identically sized conduits. However, concavities 71 and 72 are spaced sufficiently close together so that a third conduit can be supported by positioning it between the two lower conduits. Since the lower conduits are supported in concavities 71 and 72, the third conduit is also securely supported.

Figure 11:
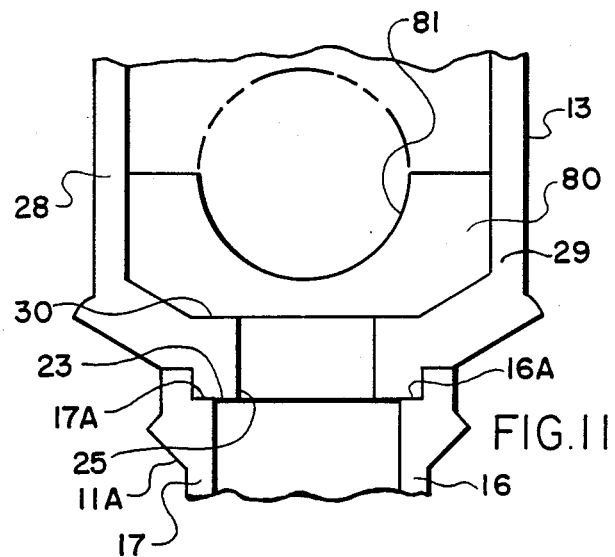
FIG. 11 is a fragmentary vertical end view of a channel segment showing another saddle embodiment.

In FIG. 11, a single, relatively large concavity 81 is formed in saddle 80.

Figure 13:
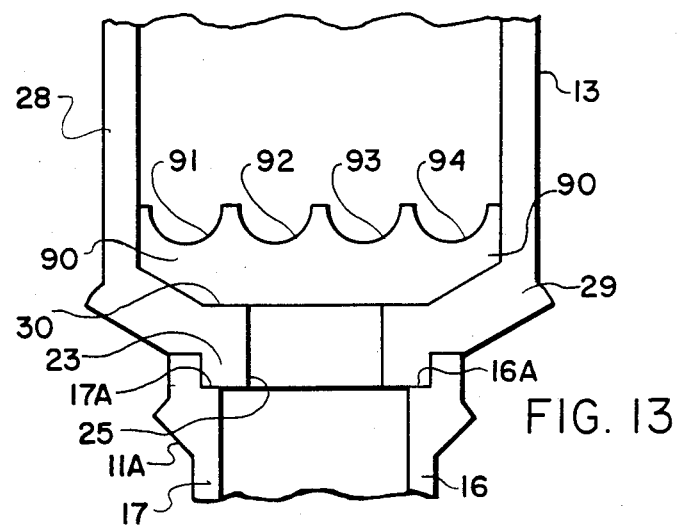
FIG. 13 is a fragmentary vertical end view of a channel segment showing another saddle embodiment.
Figure 10:
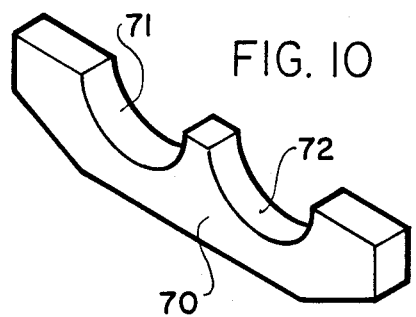
FIG. 10 is a perspective view of the saddle shown in FIG. 9.
Figure 12:
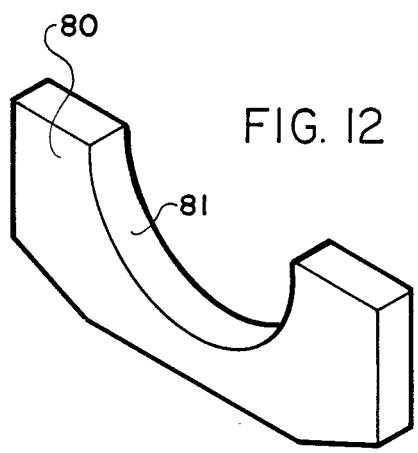
FIG. 12 is a perspective view of the saddle shown in FIG. 11.
Figure 14:
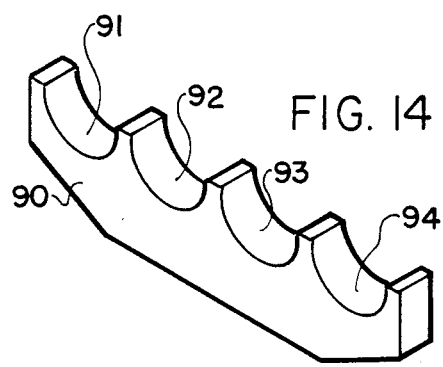
FIG. 14 is a perspective view of the saddle shown in FIG. 13.

In FIG. 13, saddle 90 includes four concavities 91–94 and supports identical conduits.

Figure 15:
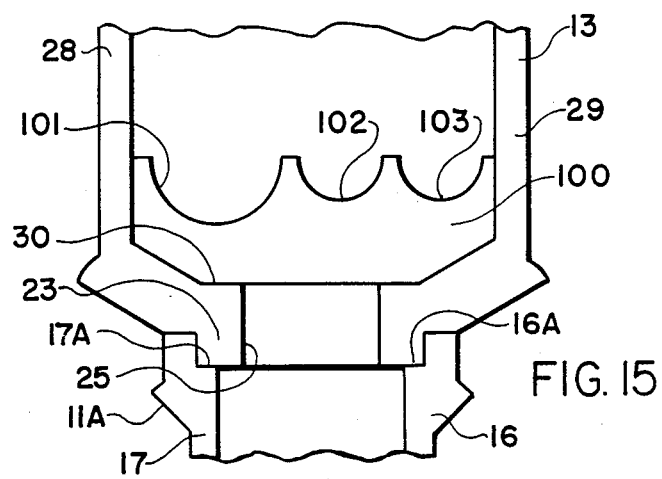
FIG. 15 is a fragmentary vertical end view of a channel segment showing another saddle embodiment.

In FIG. 15, saddle 100 supports a single, relatively large conduit in a large concavity 101 and two smaller conduits in concavities 102 and 103. As is apparent, the variety of combinations possible extend far beyond those illustrated in FIGS. 9–16, above.

Figure 17:
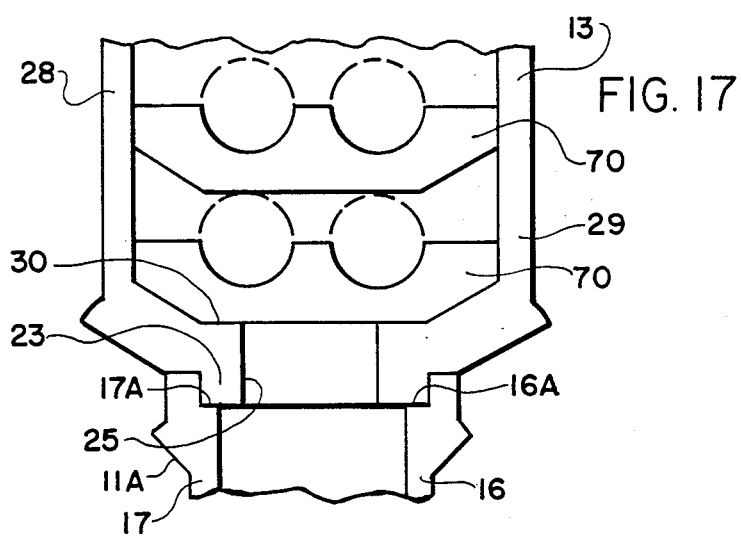
FIG. 17 is a fragmentary vertical end view of a channel segment showing vertical stacking of fluid carrying conduits by stacking the saddles within which the conduits are positioned.

Another variation using the embodiments shown in FIGS. 2, 9, 11 and 13 is illustrated in Figure 17. In situations where more conduits must be accommodated within upper channel run 12 than can be spaced-apart in a single layer, two or more saddles, for example saddle 70, can be vertically stacked. The lower saddle 70 resides within channel segment 13 in the normal fashion. The upper saddle 70 rests on top of the conduits carried in lower saddle 70 and itself carried two conduits. Since the upper saddle 70 is not in direct contact with bottom wall 30 of channel segment 13, it need not be positioned directly over drainage hole 25, as must lower saddle 70. Since the saddles are not affixed to the inner walls of channel segment 13, they are easily removed for cleaning, repairs or for routine maintenance. Damage to a particular channel segment can be easily repaired by removing just that channel segment 13 and replacing it with a new one. The precise location of any leakage or damage to the conduits within location of any leakage or damage to the conduits within channel segment 13 can be easily accomplished by removing covers 33. When the leak or damage is found, the open top permits easy access for repairs. Then, resealing of the channel segments is easily accomplished by replacing cover 33. The use of bolt 34 and locking member 35 to hold the cover 33 in position also permits a tight seal to be obtained, since the pressure against seals 43 and 44 can easily be adjusted.

Another embodiment of the invention described above is also possible. In given situations the lower channel run 11 may not be necessary. In these cases, a single channel run comprised solely of channel segments 113 can be formed, as shown in FIG. 4. By eliminating drainage holes 25, the channel segments 113 comprise the outer wall of a dual containment system, wherein the inner containment system comprises the conduits positioned in channel segments 113. In all other respects, channel segments 113 are as described above with reference to channel segments 13.

A dual wall containment channel is described above. Various details of the invention may be changed without departing from its scope. Furthermore, the foregoing description of the preferred embodiment of a dual wall containment channel according to the present invention is provided for the purpose of illustration only and not for the purpose of limitation—the invention being defined by the claims.

I claim:

1. A dual containment channel for fluids, comprising:
   (a) a plurality of channel segments arranged end-to-end to define a channel run of a predetermined desired length, each channel segment comprising:
      (i) two spaced-apart opposing channel segment side walls connected by an integrally-formed bottom wall to define a generally U-shaped structure having a top opening and a void therein for carrying a fluid; and
      (ii) a cover positioned between and supported by said side walls to enclose the open top of the channel run and retain any fluid within a said channel segment, whereby said channel run serves as an outer containment channel;
   (b) conduit supporting means separately formed and positioned in spaced-apart relation from each other within said channel run along its predetermined length and for supporting at least one elongate, closed wall, fluid carrying conduit therein, whereby any fluid leaking from the conduit is contained within the outer containment channel for ease of removal, any leaks in or damage to the conduit can be easily located and repaired by removing the cover, and any leaks in or damage to the outer containment channel can be repaired by replacing only that channel segment or segments which are actually damaged; and
   (c) sealing means cooperating with said cover and said channel segments to prevent any fluid and/or gases within said channel from escaping through the open top of the channel around the cover, said sealing means comprising said two spaced-apart opposing channel segment side walls defining an elongate groove along the longitudinal extent of said side walls and an elastomeric sealing strip positioned in said groove to sealingly engage the underside of said cover; and an end member positioned in overlapping relation between two adjacent channel segments, said end member having two opposing U-shaped grooves therein for mating with and forming a continuous groove with the grooves in said two spaced-apart opposing channel segment side walls, and an elastomeric sealing strip positioned in each of said two U-shaped grooves to form with the longitudinally extending grooves in the opposing channel segment side walls a continuous closed-loop seal for sealing engagement with the underside of said cover.

2. A dual containment channel according to claim 1, wherein each of said channel segments have walls which are the same height to define a non-sloping channel.

3. A dual containment channel according to claim 1, wherein the conduit supporting means for said conduit comprises a saddle having a concavity in the upper side thereof with a shape corresponding to the shape of the part of the conduit received and supported therein.

4. A dual containment channel according to claim 3, wherein the shape of the concavity is arcuate to receive and support a cylindrical conduit.

5. A dual containment channel according to claim 3 or 4, wherein said saddle has a plurality of concavities in the upper side thereof for receiving and supporting a like number of conduits.

6. A dual containment channel according to claim 5, wherein at least two of said saddles are stackable one over top of the other within said channel to receive and support at least two vertically spaced-apart conduits.

7. A dual containment channel for fluids, comprising:
   (a) a plurality of channel segments arranged end to end to define a lower channel run of a predetermined desired length, each channel segment of said lower channel run comprising two spaced-apart opposing channel segment side walls connected by an integrally-formed bottom wall to define a generally U-shaped structure having a top opening and a void therein for carrying a fluid;
   (b) a plurality of channel segments arranged end-to-end to define an upper channel run of a predetermined desired length positioned in the top opening of said lower channel run and supported by said two spaced-apart opposing channel segment side walls of the lower channel run, each upper channel segment comprising:
      (i) two spaced-apart opposing channel segment side walls connected by an integrally-formed bottom wall to define a generally U-shaped structure having a top opening and a void therein for carrying a fluid;
      (ii) said bottom wall defining at least one drainage hole therein for permitting fluid in said upper channel run to drain into said lower channel run; and
      (iii) a cover positioned between and supported by said side walls to enclose the open top of the upper channel run and to prevent fluid from exiting said upper channel run through the top opening, whereby said upper channel run serves as an outer containment channel;
   (c) sealing means cooperating with said cover and said channel segments to prevent any fluid and/or gases within said channel from escaping through the open top of the channel around the cover, said sealing means comprising said two spaced-apart opposing channel segment side walls defining an elongate groove along the longitudinal extent of said side walls and an elastomeric sealing strip positioned in said groove to sealingly engage the underside of said cover; and an end member positioned in overlapping relation between two adjacent channel segments, said end member having two opposing U-shaped grooves therein for mating with and forming a continuous groove with the grooves in said two spaced-apart opposing channel segment side walls, and an elastomeric sealing strip positioned in each of said two U-shaped grooves to form with the longitudinally extending grooves in the opposing channel segment side walls a continuous closed-loop seal for sealing engagement with the underside of said cover; and
   (d) conduit supporting means positioned in spaced-apart relation from each other within said upper channel run along its predetermined length for supporting at least one elongate, closed wall, fluid carrying conduit therein, whereby any fluid leaking from the conduit drains into said upper channel run and then through at least one drainage hole into said lower channel run for removal, whereby any leaks in or damage to the conduit can be easily located and repaired by removing the cover and any leaks in or damage to the outer containment channel can be repaired by replacing only that channel segment or segments which are actually damaged.

8. A dual containment channel according to claim 7, wherein each of said upper channel segments have walls which are the same height to define a non-sloping channel.

9. A dual containment channel according to claim 7, wherein each of said channel segments along the length of the lower channel run have progressively higher walls to define a sloping channel.

10. A dual containment channel according to claim 7, wherein the supporting means for said conduit comprises a saddle having a concavity in the upper side thereof having a shape corresponding to the shape of the part of the conduit received and supported therein.

11. A dual containment channel according to claim 10, wherein the shape of the concavity is arcuate to receive and support a cylindrical conduit.

12. A dual containment channel according to claim 10, wherein said saddle has a plurality of concavities in the upper side thereof for receiving and supporting a like number of conduits.

13. A dual containment channel according to claim 10, wherein at least two of said saddles are stackable one over top of the other within said upper channel run to receive and support at least two vertically spaced-apart conduits.

14. A dual containment channel according to claims 7, 9, 12, or 13, wherein said drainage hole has a dimension along the longitudinal extent of the channel run which is greater than the dimension of the saddle along the longitudinal axis of the channel run, and wherein said saddle is positioned over a central portion of the drainage hole leaving opposing side portions of the hole exposed within the channel run to receive and allow fluid to drain through either or both sides thereof.

* * * * *